United States Patent
Petiton et al.

(10) Patent No.: US 8,488,223 B2
(45) Date of Patent: Jul. 16, 2013

(54) OPTICAL SECURITY MARKING COMPONENT, METHOD OF MANUFACTURING SUCH A COMPONENT, SYSTEM COMPRISING SUCH A COMPONENT, AND READER FOR CHECKING SUCH A COMPONENT

(75) Inventors: Valéry Petiton, Vendrest (FR); Alexandre Noizet, Bussy-Saint-Georges (FR)

(73) Assignee: Hologram Industries, Bussy Saint Georges (FR)

(*) Notice: Subject to any disclaimer, the term of this patent is extended or adjusted under 35 U.S.C. 154(b) by 644 days.

(21) Appl. No.: 12/299,200

(22) PCT Filed: May 2, 2007

(86) PCT No.: PCT/FR2007/051201
§ 371 (c)(1), (2), (4) Date: Jan. 14, 2009

(87) PCT Pub. No.: WO2007/125266
PCT Pub. Date: Nov. 8, 2007

(65) Prior Publication Data
US 2009/0190223 A1    Jul. 30, 2009

(30) Foreign Application Priority Data

May 2, 2006   (FR) .................................... 06 51571
May 2, 2007   (FR) .................................... 07 54814

(51) Int. Cl.
*G03H 1/00* (2006.01)
(52) U.S. Cl.
USPC ............................................................ 359/2

(58) Field of Classification Search
USPC ......... 359/2–4, 6–8, 22, 24, 567, 599; 283/86
See application file for complete search history.

(56) References Cited

U.S. PATENT DOCUMENTS

| | | | | |
|---|---|---|---|---|
| 4,856,857 | A * | 8/1989 | Takeuchi et al. | 359/3 |
| 6,909,547 | B2 | 6/2005 | Weitender et al. | |
| 2003/0072412 | A1* | 4/2003 | Martynov et al. | 378/84 |
| 2004/0240006 | A1* | 12/2004 | Staub et al. | 359/2 |
| 2005/0094274 | A1* | 5/2005 | Souparis | 359/586 |
| 2007/0053028 | A1* | 3/2007 | Ezra | 359/2 |
| 2007/0159671 | A1* | 7/2007 | Hoshino et al. | 359/2 |

FOREIGN PATENT DOCUMENTS

| EP | 1 650 587 A | 4/2006 |
|---|---|---|
| EP | 1650587 A1 * | 4/2006 |

OTHER PUBLICATIONS

Palmer, Diffraction Grating Handbook, 4th Ed. 2000 (p. 94).*
Gale et al., "Zero-Order Diffractive Microsturctures For Security Applications" SPIE vol. 1210 Optical Security and Anticounterfeiting Systems, (1990), pp. 83-89.

* cited by examiner

*Primary Examiner* — Stephone Allen
*Assistant Examiner* — Kimberly N Kakalec
(74) *Attorney, Agent, or Firm* — Arent Fox LLP (57) ABSTRACT

The present invention relates to an optical security marking component producing a first visible configuration when observed through a polarizer oriented in a first orientation, and a second configuration, separate from the first, visible when observed through the polarizer oriented in a second orientation, the optical component comprising a stamped film for forming at least two diffraction gratings having different orientations, characterized in that each of said gratings has a period of less than 550 nm and a modulation between 0.25 and 0.5 relative to a reference plane.

19 Claims, 5 Drawing Sheets

Figure 1 definition of polarization conditions, angle of incidence θ and orientation of the grating

Rotation of the polarizer by 90°

Inspection through the polarizing agent A

Figure 10

Inspection through the polarizing agent B

OPTICAL SECURITY MARKING COMPONENT, METHOD OF MANUFACTURING SUCH A COMPONENT, SYSTEM COMPRISING SUCH A COMPONENT, AND READER FOR CHECKING SUCH A COMPONENT

CROSS-REFERENCE TO RELATED APPLICATION

This application is a National Stage entry of International Application No. PCT/FR2007/051201, filed May 2, 2007, the disclosure of the prior application is incorporated in its entirety by reference.

The present invention relates to a security optical imaging component aiming at making optical checking keys which can be integrated in a DOVID (Diffractive Optical Variable Image Device) and which cannot be authentified but by the appropriate reading tool.

Such optical marking component is dedicated to the authentication of a product or a document which such optical security component is applied on.

It relates to the general family of optical components formed by stamping diffraction gratings in a thermosetting layer supported by a transparent film. Depending on the observation parameters (orientation with respect to the observation axes, position and the dimension of the light source, etc.), the optical effects generated by the optical security component take very characteristic and controllable configurations. The general purpose of such optical component consists in supplying new and different effects, from physical configurations of the film which are difficult to reproduce or even difficult to analyse.

Among such an optical component family formed by the stamping of transparent films, the closest state of the art is the U.S. Pat. No. 6,909,547.

Such patent discloses a security element obtained from a plastic laminate and having a mosaic pattern composed of surface elements. Such laminate has a diffraction structure $\{B(x, y, T)\}$ produced from a superposition:

of a first low frequency structure $\{G(x, y)\}$ and
a high frequency relief structure $\{R(x, y)\}$ The film has two areas producing different optical effects.

In a first surface element, the vectors of both structures $\{G(x, y)\}$ and $\{R(x, y)\}$ are parallel.

In the other surface element, both vectors have a substantially right angle.

The vectors of the structures $\{G(x, y)\}$ are also parallel in both surface elements. A common edge of such surface element is visible only in a linearly polarized light. In the daylight both surface elements have the same surface luminosity.

The observation of such optical security component according to the prior art results in two very different aspects, with an inversion of the contrast as a function of the orientation of a polarizer interposed between the observer's eye and the optical component. When rotating relatively by 90°, the light graphic element becomes dark and reversely.

The drawback is that, in the absence of the polarizer, the observation of the optical component does not make it possible to detect the high frequency structures. Thus, an efficient counterfeit can easily be made using a low frequency grating on the whole surface.

Another drawback of the structure provided lies in the fact that it is intrinsically very sensitive to the observation conditions which depend on the source and the position of the observer. As a matter of fact, the structure described in the priorities is limited to effects which appear in an incidence plane only.

In the state of the art patent EP1650587 is also known, which discloses an optical marking component for the fight against infringement, producing a first direction visible when observed through a polarizer oriented in a first orientation and a second visible configuration when observed through a polarizer oriented in a second direction.

The component according to this patent includes a film stamped for forming two diffracting gratings having separate orientations. One of the networks has a smaller period than half the wavelength.

Such a component is not totally satisfactory since, in the presence of an ambient light, the legibility of both configurations is affected.

The aim of the present invention is to remedy such drawbacks while providing an optical security component which can be checked by the interposition of a polarizer having in addition a configuration legible in an ambient light, non polarized, and by nature having a greater tolerance to the conditions of observation of the polarized effect.

For this purpose, the invention also relates, in the broadest meaning thereof, to an optical security marking component producing a first visible configuration when observed through a polarizer oriented in a first orientation, and a second configuration, separate from the first, visible when observed through a polarizer oriented along a second orientation; the optical component comprising a stamped film to form at least two diffracting gratings having different orientations, characterized in that each of said gratings has a pitch of less than 550 nm and a modulation between 0.25 and 0.5 with respect to a reference plane. Preferably, the modulation is included between 0.4 and 0.5 with respect to a reference plane.

Advantageously, each grating is formed in a predefined graphic configuration, having visible dimensions, with the gratings having adjacent limits.

According to a variation, the gratings have perpendicular main vectors.

According to an advantageous variation, the optical marking component further includes a diffusing treatment.

According to a first implementation, the diffusing treatment is composed of a diffusing layer deposited on the optical layers.

According to a second implementation, the diffusing treatment is integrated in the sub-wavelength structure.

According to a first embodiment, the component includes a stamped transparent film coated with a metallic reflecting layer.

According to a second embodiment, the resulting structure (a sub-wavelength grating combined to the diffusing structure) is encapsulated between 2 layers having different optical indexes (one high index and one low index of refraction). This implementation has the advantage of allowing an immediate visual checking without any specific tool.

Preferably, a reflecting layer is coated with an adhesive so that it can be applied onto a support to be authentified.

Advantageously, the stamped film is composed of a transparent birefringent material.

The invention also relates to a method for manufacturing an optical marking component producing a first visible configuration when observed through a polarizer oriented in a first orientation and a second configuration separate from the first one, visible when observed through the polarizer oriented along a second orientation; the optical component comprising a stamped film for forming at least two diffraction gratings having different orientations, with each of said gratings having a period of less than 550 nm and a modulation between 0.25 and 0.5 relative to a reference plane; the component comprising further a diffusing treatment, characterized in that said diffusing treatment comprises a step of storage on the same region of a photosensitive material exposed to light to form a sub wavelength grating, and a structure of the "speckle" type, then a step of duplication of the structure on a thermosetting material to form a layer having a modulation of the relief corresponding to the registered structure whereon a metallic deposition of thin metallic or dielectric layers is then formed, then a coating with a protective varnish and an adhesive layer.

The invention also relates to an authentication system comprising an optical marking component and an adapted reader characterized in that the optical security marking component comprises a stamped film for forming at least two diffracting gratings having different orientations, each having a period of less than 550 nm and a modulation between 0.25 and 0.5 relative to a reference plane, the reader comprising a polarizer movable in rotation with respect to an optical component to be checked and positioned in the reader. Preferably, the modulation is about 0.5.

The invention also relates to a reader intended for checking an optical marking component comprising a stamped film for forming at least two diffracting gratings having different orientations, each having a period of less of 550 nm and a modulation between 0.25 and 0.5 with respect to the reference plane characterized in that it includes a polarizer which is movable in relative rotation with respect to an optical component to be checked and positioned in the reader.

According to a particular variation, the reader according to the invention includes two parts of juxtaposed polarizers, the main axes of which are oriented perpendicularly, the orientation of the axes of such polarizers being adapted to the orientations of the grating vectors, said polarizers being movable in translation to make the configurations of the optical component to be checked appear successively in an observation window.

Advantageously, the reader includes a diffusing element positioned between the polarizers and the component to be checked.

The invention will be more easily understood upon reading the following description relating to non limitative exemplary embodiments, wherein.

Advantageously, gratings will be used having a period of less than 300 nm for the embodiment of a semi-buried optical security component. Such gratings are characterized in that the diffraction in the visible field is very limited. The order 1 is hardly visible when observed in a raking light.

Such gratings have particular optical characteristics which can be seen with the naked eye but which can only be checked using a polarizing filter. The gratings implemented by the invention have a period of less than a wavelength (typically 550 nm for the visible) and a high modulation (comprised between 0.25 and 0.5) so that the incident light is almost totally absorbed. Light the polarization direction of which is perpendicular to the grating vector is diffracted only. Light diffracted by this type of gratings is thus polarized.

Figure 1:
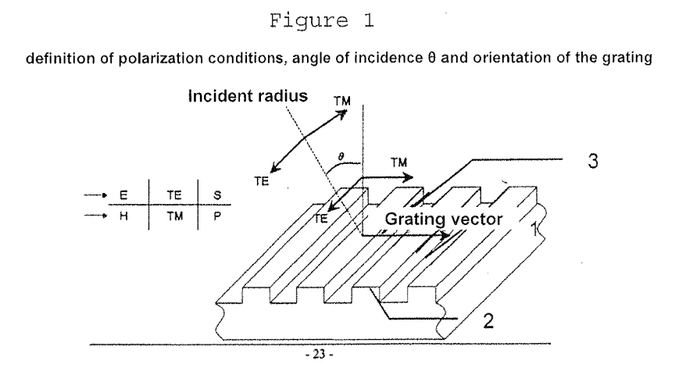
FIG. 1 shows a schematic view of a diffracting grating implemented by the invention.

FIG. 1 shows a view of such a grating having alternating bumps 1 and recesses 2 extended to form a grating oriented along a vector 3.

The light polarized according to the TM mode is absorbed whereas the component polarized according to the TE mode is reflected alone.

The zero order diffracted light is the only one to be polarized but the polarization effect cannot be observed on higher orders.

The grating is formed by stamping in a polyester film intended for the production of holograms and coated with a stampable layer of material which the nanostructures are transferred to. The stamped layer is then covered for example by evaporation under vacuum with a metallic reflecting layer, then coated with an adhesive adapted to the product to be made (cold adhesive for labels, hot adhesive for laminating films or hot transfer films).

This component comprises above mentioned gratings used for making a checking key integrated by juxtaposition or insertion into a DOVID (Diffractive Optical Variable Image Device). Such gratings are never used when they are superimposed with one of the diffracting element of the DOVID. A slight trace is thus visible on the surface which reveals the print of the checking key.

The reader is composed of polarizing filters making it possible to disclose the information.

The assembly allows the positioning of the security element within a holographic image.

From a graphic point of view, the sub-wavelength gratings will be used in pairs imbricated in each other to draw positive/negative effects, multiplexing effects or any other appropriate effect, thus using text elements as well as graphic elements.

More particularly, the gratings can be used for inscribing binary codes which can be read in a machine.

Figure 2:
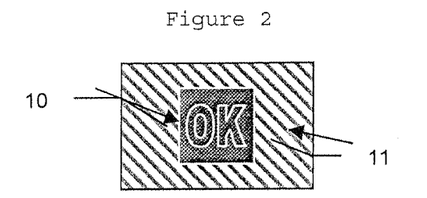
FIGS. 2 to 4 show the component when observed in various observation configurations.
Figure 3:
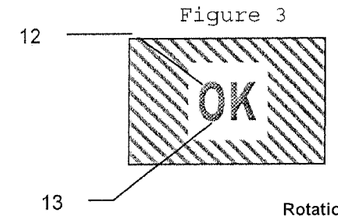
Figure 4:
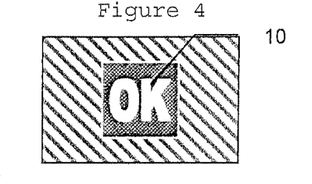

FIGS. 2 to 4 show exemplary embodiments of a component according to the invention.

The optical component is a structure of the DOVID type (11) with an area forming the control key (10). This area shows a first configuration (FIG. 2) when it is observed in a non polarized ambient light and two configurations having a reversed contrast (FIGS. 3 and 4) when it is observed from a polarizer respectively oriented in a first orientation and a second orientation.

The area 12 has a grating of pitch of less than 550 nanometers with an orientation vector according to a first direction. The shape of this area 12 points out the character <<OK>>. The area 13 has a grating of pitch of less than 550 nanometers with an orientation vector perpendicular to the first direction.

The shape of this area 12 points out a square surface complementary to the character <<OK>>.

In ambient light, the shape of the two areas 12, 13 remains visible and forms an additional recognition mode.

Figure 5:
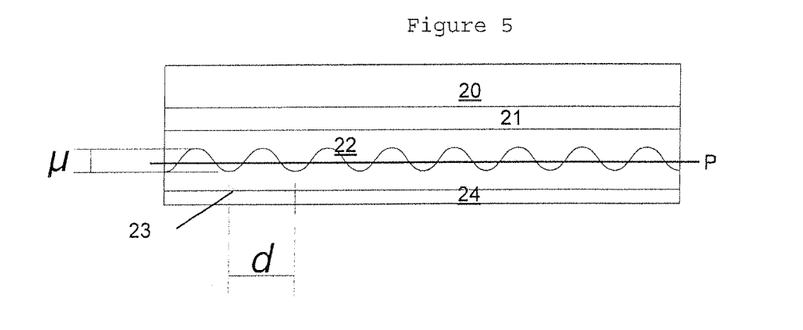
FIG. 5 shows a cross-sectional view of a component according to the invention.
Figure 6:
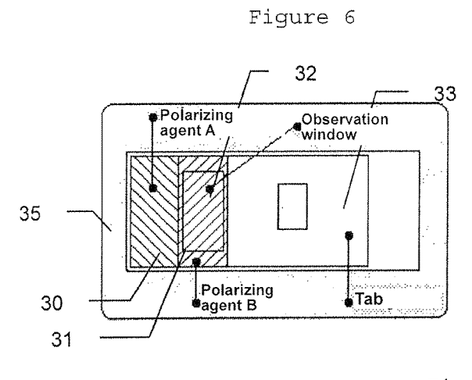
FIGS. 6 to 8 show respectively top views of the movable part and cross-sectional views of a reader according to the invention.
Figure 7:
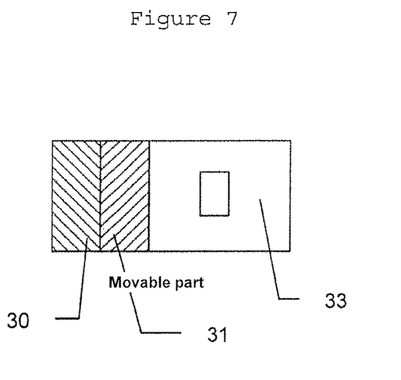
Figure 8:
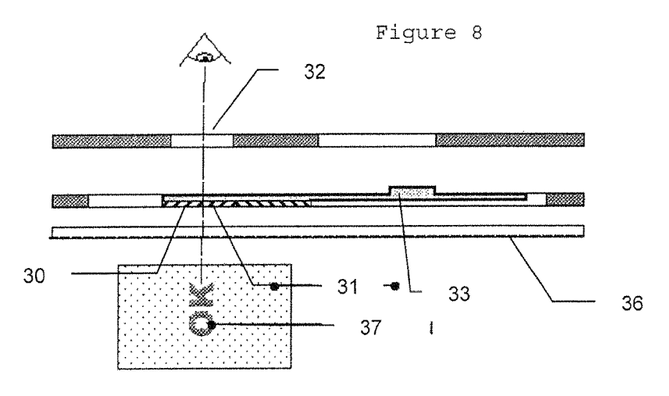

FIG. 5 shows a cross-sectional view of the component made in the form of a destructive label or hot marking.

The component includes:

a support layer 20 formed by a film made of a plastic material. Such layer is intended for the support of the component at least up to the transfer thereof on the document or on the product to be authentified, a detachable layer 21, optional, making it possible to separate the component from the support layer while it is applied on the product in the case of a laminated product or of a hot marking, a stamped holographic layer 22 which is transparent, a reflecting coating 23 which can be metallic or transparent and has a high refraction index, an adhesive layer 24.

The stamped holographic layer has a deformation so that:

$$0.25 < \mu/d < 0.5$$

where d is the pitch of the grating

And $\mu$ is a characteristic of the grating between 0.25 and 0.5 and preferably between 0.4 and 0.5.

As the products known in the prior art, the object of the invention can be integrated in products making it possible to produce labels or hot marking films or laminating products.

A part of the holographic layer (23) can be de-metallized, with such de-metallization which can be superimposed with the exposed structure.

The reflecting layer is a metallic layer (typically aluminium, copper, chromium). It is also possible to use a transparent material having a high refraction index such as ZnS, $TiO_2$.

When combining with the de-metallization, it is also possible to obtain optical components having multiple aspects (aluminium, copper, transparent, etc.) without creating any discontinuity in the checking key.

In a particular embodiment, the grating vectors are aligned with the neutral axes of the transparent birefringent materials used as supports for the labels (BOPP type). Such alignment makes it possible to optimise the efficiency of the optical effect transferred onto the support.

FIGS. 6 to 10 show views of a reader for the checking of a component according to the invention.

The reader is operated using the following principles:

observation of the light reflecting by the surface of the control key (direct reflexion or order 0 reflexion), through one or several polarizing filters or any other element having a birefringent nature making it possible to highlight the polarization of the light reflected by the key, highlighting the inversion of contrast between the various image elements.

The simplest reader is composed of a simple polarizer. When placed in front of the light reflected by the grating, only the light, the polarization direction of which is parallel to the main axis thereof, can go through. A simple rotation of the checked document or of the reader makes it possible to alternately show both image areas which have been perpendicularly oriented.

FIGS. 6 to 10 show an optimised (translational) hand reader. It is composed of a frame 35 including a movable part 33 provided with two juxtaposed polarized parts 30, 31, the main axes of which are perpendicularly oriented. The orientation of the axes of such polarizers is adapted to the orientations of the grating vectors. As the reader is positioned on the image so as to observe the direct reflexion of the incident light on the control key, a translation movement will make it possible to visualise a tilting of both components of the image.

Advantageously, a frosted diffusing element 36 is positioned between the polarizers and the component 37 to be checked so as to:

reduce the glare caused by the source which is reflected on the control key, simulate a large lighting source, oblige the person making the checking to position the reader on the key to be checked (ergonomy/unique position/simplicity).

Figure 9:
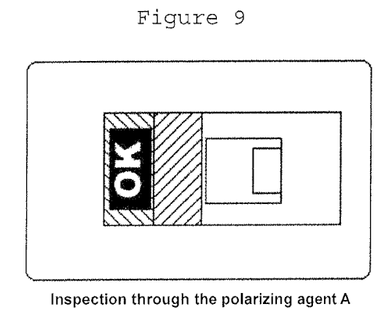
FIGS. 9 and 10 show views of the component through the reader along two positions of the movable part.
Figure 10:
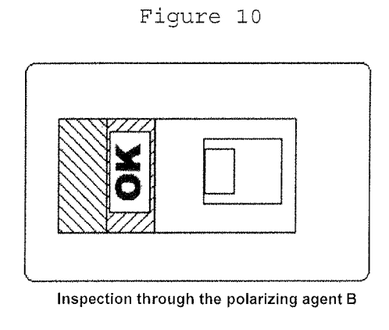

FIGS. 9 and 10 show views of the component, when positioned in the reader, when the movable part respectively places the first and the second polarizer in the window.

An alternate reader consists in integrating the various elements in a totally automated device.

Such category of readers concerns automatic readers:

either made by an automatic rotation of the polarizing filter, or through the automatic translation of a carriage composed of 2 crossed polarizers.

A last category of readers concerns the readers using birefringent focuses:

for example, using a Wollaston prism which separates the polarizations. A Wollaston prism makes a deviation of about 20° between the two polarizations. In this case, the observation is made on a simultaneous viewing of both modes which are shifted in the same observation plane.

Figure 11:
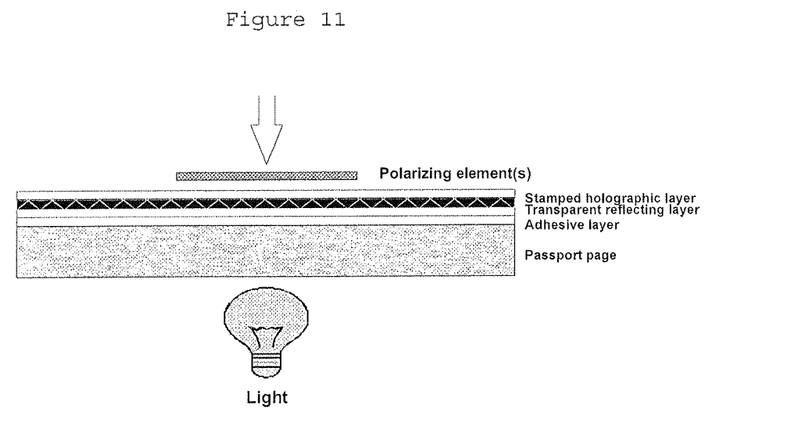
FIG. 11 shows a cross-sectional view of a variation of the invention.

Another embodiment shown in FIG. 11 allows the reading by transmission.

This solution is adapted for products integrated in transparent films such as those which are used for protecting variable mentions in identification documents. All the gratings composing the holographic image are then coated with a transparent dielectric material layer.

The checking of the key will be advantageously carried out when reading the document through paper. The paper then replaces the diffusing structure of the reader 5b.

Another embodiment consists in combining (superimposing) the image composed of both gratings oriented perpendicularly, a structure having a random and chaotic nature such as those which are used for performing white (mat or brilliant) effects. Such combination has the advantage of improving the contrast and of modifying the surface aspect.

This combination has the same effect as the integration of one part of the checking tool (in this case diffusing element of the reader) in the checking key which makes it possible, in the following, to simplify the reader.

The following description corresponds to non limitative examples of such an embodiment.

The alternative embodiment mentioned hereinunder aims at improving the safety components using the property of the 1D or 2D with sub-wavelength gratings by the addition of a diffusing optical function: this function is neither refractive nor diffractive. It makes it possible to widen the visibility cone of the zero order effects to make it easy to observe around the specular reflexion.

This function may be superimposed through the mechanical stacking of the layers, but it is preferably directly integrated into the sub-wavelength structure.

One solution consists in directly encapsulating the structure resulting from the coupling between the sub-wavelength grating and the diffusing function in order to extend the observation angle of the zero order colour permutation effect.

The zero order effect is then in a diffusion cone and is not limited to the incident plane. It is thus less sensitive to the lighting conditions and resists the positioning deviations.

Figure 12:
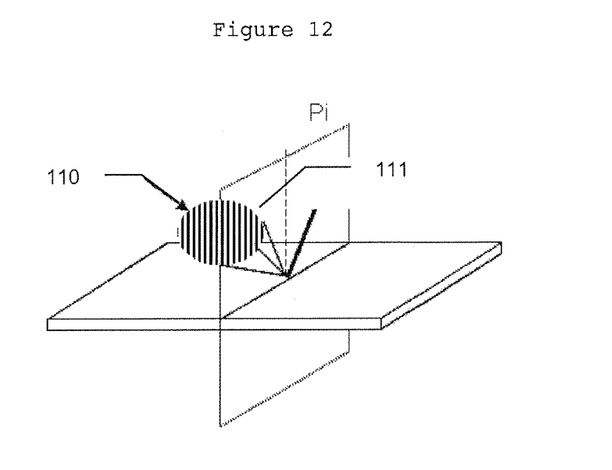
FIG. 12 shows a schematic view of the diffusion cone with respect to the direction of the incident light.

FIG. 12 shows a schematic view of the diffusion cone 110 with respect to the direction of the incident light 111.

Figure 13:
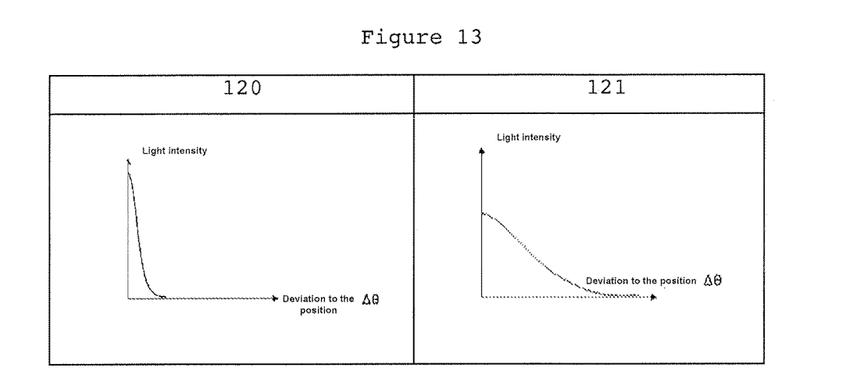
FIG. 13 shows the curve of light intensity as a function of the deviation to the position in the standard case and according to the encapsulated structure.

FIG. 13 shows the curve light intensity as a function of the position deviation in the standard case (curve 120) and according to the encapsulated structure (curve 121). The angle θ represents the ideal observation angle for the given lighting conditions and Δθ the deviation with respect to such angle.

A loss of the intensity of the light reflected by the new structure is observed, however this light is angularly spread on either side of the optimal position.

This solution makes it possible:

to improve the subjectivity of the optical effect by making the component little sensitive to the lighting conditions: with a punctual source as well as with a spread source, not to change the nature of the perceived colours: preservation of the colour and the saturation, to give a new non standard appearance to the security components using such encapsulated sub-wavelength gratings, to make an additional permutation of colour appear: visible thanks to the variation of the incident angle.

The cone opening angle depends on the diffusing function used. The smaller the dimensions of the diffusing elements, the larger the opening of the cone and vice versa.

The diffusing function may be isotropic (the implemented microstructures are symmetrical in rotation and give an identical effect whatever the azimuth angle) or anisotropic (in this case, the random structure is oriented and is no longer symmetrical).

Such diffusing function then adds an additional degree of freedom for designing security components using this technique. It would be necessary to adapt the structure to the application desired (hot marking, labelling . . . ) and to the desired optical effect.

Figure 14:
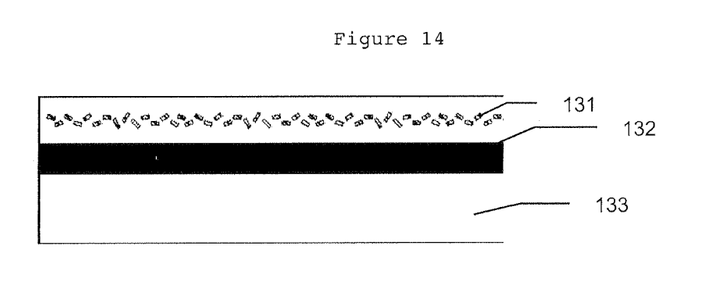
FIG. 14 shows a cross-sectional view of such a component, comprising an encapsulated structure, a layer of coloured varnish and an adhesive layer.

Advantageously, a coloured varnish coated under the encapsulated structure will improve the subjectivity of the component. FIG. 14 shows the cross-sectional view of such a component, comprising an encapsulated structure 131, a coloured varnish layer 132 and an adhesive layer 133.

An absorption phenomenon is thus added to the created optical effect. The coupling between the absorption, the diffusion and the zero order effect of the encapsulated sub-wavelength grating gives an optical component having an excellent behaviour with the observation angle and also a bright new aspect. Such unique combination is totally different from the colour permutation components known in the state of the art.

The relief structure resulting from the coupling between the sub-wavelength grating and the diffusion function preserve all the properties of the relief sub-wavelength gratings on a metal. Such structure will reflect, diffuse and linearly polarize the incident light. Such light is revealed using a polarizing filter.

Figure 15:
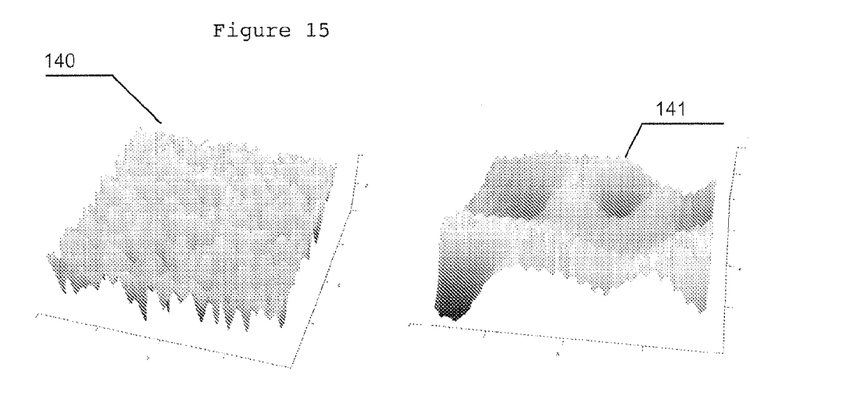
FIG. 15 shows a 3D view of the new surface structure with 2 different magnifications.

FIG. 15 shows a 3D view of the new structure with 2 different magnifications. The scale factor between 140 and 141 is 7. In 141, the modulation of the diffracting structure by the chaotic and isotropic diffusing function can be easily observed.

A complete non limitative embodiment of a security component described in the invention is:

Creation of the Structure

The sub-wavelength grating and a structure of the "Speckle" type, the physical characteristics (grain dimensions . . . ) of which can be controlled, are stored for example by means of an interferential photolithography method on the same region of a photosensitive material.

Other technologies can be used for storing the structure: direct etching using a beam of electron, XUV microlithography etc.

Duplication of the Structure

A hard copy of the structure is then generated using an electroplating method with a view to a mass duplication. A foil of nickel is the result of this method. The surface thereof shows the nanostructures to be duplicated.

The foil of nickel is mounted on the heating cylinder which will mould a thermoplastic film of the PET type. This is a mass duplication step.

Other masses duplication techniques can be used: UV casting, UV embossing, etc.

Deposition of Dielectric Material

The dielectric material used as a wave guide is deposited using a vacuum deposition method. However, deposition techniques are available and thus are perfectly adapted to the embodiment. The influencing parameter is the layer of material which will give the desired zero order effect when coupled with the sub-wavelength grating.

Coating

This step consists in coating a varnish which will encapsulate the structure and an adhesive which will make it possible to apply the component onto the document to be protected.

All the available concepts of image using this structure are valid for the transparent documents (generally used for the protection of security documents) as well as for opaque components. The description of the following examples gives details on the effects which be visible for a naked eye and which are added to the effects which are visible with the polarizer as described in FIG. 2.

Figure 16:
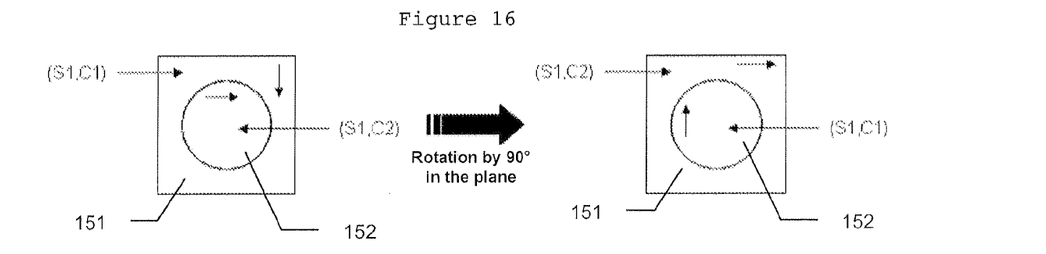
FIG. 16 shows a schematic view of a variation of an optical component according to the invention.

The optical component includes two areas (151, 152) in the example illustrated in FIG. 16.

When the component is oriented along a first direction, the area 151 appears in a first colour C1, and the central area 152 appears in a second colour C2.

When the component is turned by a quarter turn in a plane thereof, the observation and lighting directions remain unchanged, the colours of the areas 151 and 152 are reversed: the area 151 appears in the second colour C2 and the inner area 152 appears in the first colour C1.

The component described in this example is composed of two regions having the same structure, but the grating vectors (1D gratings) are perpendicular. The component only has two different colours C1 and C2 which are switched with a rotation by 90° of the component in the plane.

Then, it is possible to integrate graphic elements having microscopic dimensions which can be detected using an optical microscope into the new structure.

An alternative embodiment consists, with other sub-wavelength structures, in producing an image in only one colour with different intensities. The grating vectors are parallel and the characteristics of the gratings are identical and both regions show the same colour. The diffusing function of the first region is different from the diffusing function of the second region. This difference is revealed to the naked eye by a different reflecting light intensity which can be compared to a Watermark zero order visible effect.

Figure 17:
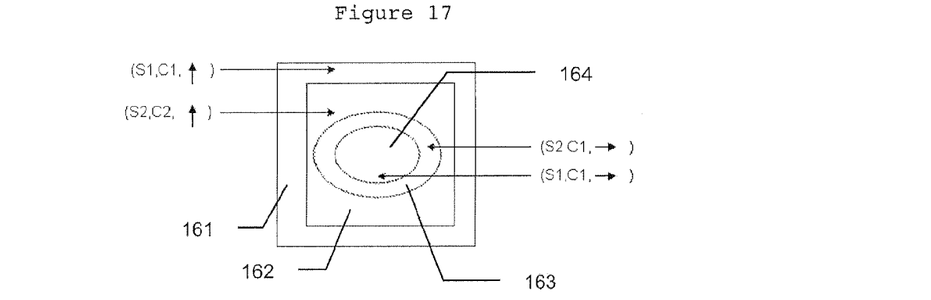
FIG. 17 shows another embodiment with two structures, two colours and two light intensities.

FIG. 17 illustrates another embodiment with two structures, two colours and two light intensities.

The component is made of two different structures: S1 is the strongly diffusing encapsulated structure and corresponds to the surfaces 161 and 164 and S2 is a low diffusion encapsulated sub-wavelength structure corresponding to the surfaces 162 and 163. Then the component has two different colours C1 and C2 for the reflection and also two images which appear thanks to the Watermark effect because of their different intensity. When the component is rotated by one quarter turn in the plane, the colours C1 and C2 switch and the Watermark effect is still present.

The invention may be used for all the optical security components of the hologram type having a metallic or dielectric layer which makes it possible to combine the advantages and level of security of the standard holograms and the products resulting from the invention.

The invention claimed is:

1. An optical security marking component producing a first configuration visible when observed through a polarizer oriented in a first orientation, and a second configuration separate from the first, visible when observed through a polarizer oriented in a second orientation, the optical component comprising:
   a stamped transparent film for forming at least two diffraction gratings having different orientations; and
   a reflecting coating coated on the stamped transparent film, the reflecting coating being at least one of metallic and transparent,
   wherein each of said gratings has a period of less than 550 nm, and a uniform modulation $\mu=h/d$ between 0.25 and 0.5 relative to a reference plane, wherein h is the groove height and d is the groove spacing, the stamped transparent film having a surface, said surface having a random and chaotic nature.

2. An optical marking component according to claim 1, further comprising a diffusing treatment.

3. An optical marking component according to claim 2, wherein the diffusing treatment is constituted by a diffusing layer.

4. An optical marking component according to claim 3, wherein said stamped film, said structure, and said diffusing layer are integrated in a sub wavelength grating.

5. An optical marking component according to claim 4, wherein a diffusing structure comprises said stamped film, said structure, and said diffusing layer, and wherein the diffusing structure is encapsulated between a first layer having a low index of refraction, and a second layer having a high index of refraction, and wherein the encapsulated diffusing structure enables an immediate visual check without an additional reading tool.

6. An optical marking component according to claim 1, wherein each of the gratings is formed in a predefined graphic configuration having visible dimensions, the gratings having adjacent limits.

7. An optical marking component according to claim 1, wherein the two diffraction gratings have perpendicular main vectors.

8. An optical marking component according to claim 1, wherein said stamped film comprises a transparent film coated with a metallic reflecting layer.

9. An optical marking component according to claim 8, wherein the reflecting layer is formed by a transparent material having a high refraction index.

10. An optical marking component according to claim 8, wherein the reflecting layer is coated with an adhesive for the positioning on a support to be authentified.

11. An optical marking component according to claim 8, wherein the reflecting layer is partially de-metallized.

12. An optical marking component according to claim 1, wherein the stamped film comprises a transparent birefringent material.

13. An authentication system that enables a user to visually observe an optical security marking component, the authentication system comprising:
   an optical security marking component including: a stamped transparent film for forming at least two diffraction gratings having different orientations, a metallic reflecting layer coated on the stamped transparent film, each of said gratings having a period of less than 550 nm and a uniform modulation $\mu=h/d$ between 0.25 and 0.5 relative to a reference plane, wherein h is the groove height and d is the groove spacing, wherein the stamped transparent film has a surface, said surface having a random and chaotic nature; and
   an adapted reader including a polarizer, the reader configured to enable a user to observe the optical component along two different polarization directions.

14. The authentication system according to claim 13, wherein the polarizer is movable in relative rotation with respect to an optical component to be checked and positioned in the reader.

15. The authentication system according to claim 14, further comprising a diffusing element positioned between the polarizers and the component to be checked.

16. The authentication system according to claim 13, wherein the polarizer includes two pieces of adjacent polarizers, the main axes of which are oriented perpendicularly, with the orientation of the axes of such polarizers being adapted to the orientations of the grating vectors, said polarizers being movable in translation to make the various configurations of the optical component to be checked appear successively in an observation window.

17. The authentication system according to claim 16, further comprising a diffusing element positioned between the polarizers and the component to be checked.

18. The authentication system according to claim 13, further comprising a diffusing element positioned between the polarizers and the component to be checked.

19. The authentication system according to claim 13, further comprising a Wollaston prism performing the separation of the two modes of the optical component in an observation plane.

* * * * *